April 2, 1940. R. B. SARGENT Re. 21,416
SUCTION MECHANISM
Original Filed Dec. 18, 1937
Fig. 4.
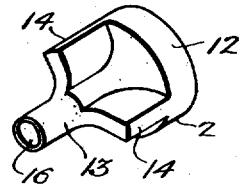
Fig. 1.
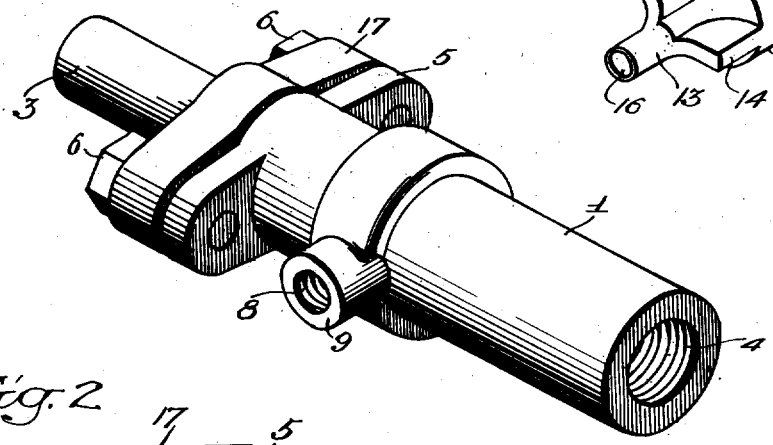
Fig. 2
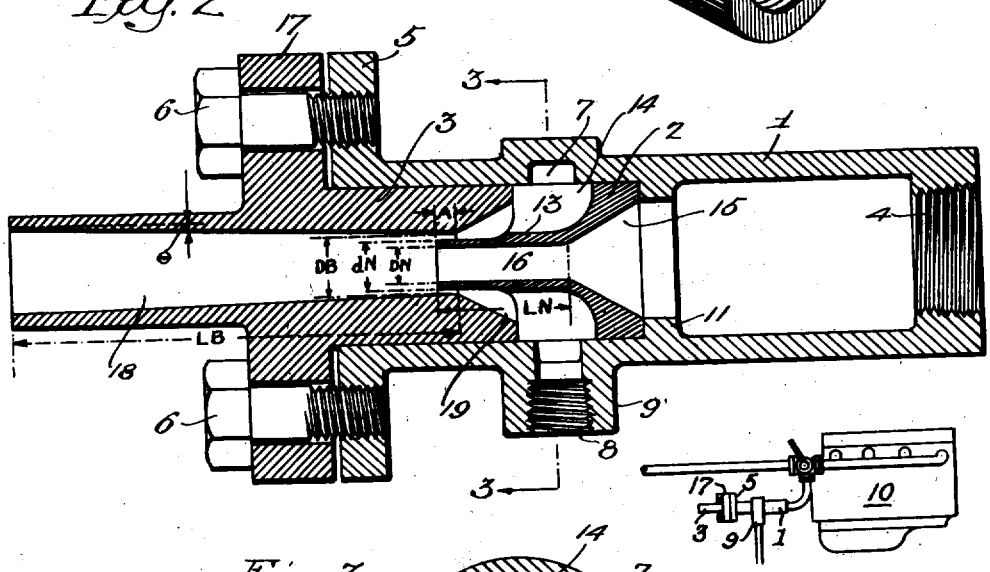
Fig. 3
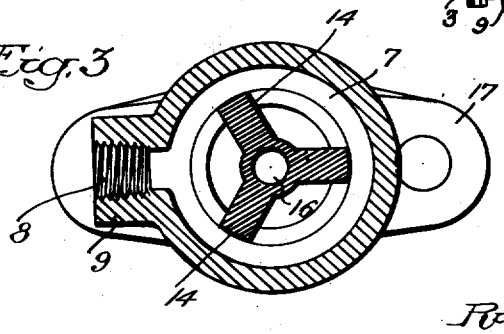
Fig. 5
Inventor
Richard B. Sargent
by his Attorneys
Howson & Howson Reissued Apr. 2, 1940

Re. 21,416

UNITED STATES PATENT OFFICE 21,416

SUCTION MECHANISM

Richard B. Sargent, Philadelphia, Pa., assignor to The Hale Fire Pump Co., Inc., Conshohocken, Pa., a corporation of Pennsylvania Original No. 2,180,259, dated November 14, 1939, Serial No. 180,654, December 18, 1937. Application for reissue February 8, 1940, Serial No. 317,998

3 Claims. (Cl. 230—95)

This invention relates to improvements in suction mechanism of the type utilizing for motivation the fluid pressure generated in the exhaust of an internal combustion engine. Such mechanisms may be employed, for example, for priming centrifugal pumps, and are of particular utility in connection with fire fighting apparatus wherein the internal combustion motor of the fire engine is commonly employed to drive the pump or pumps forming essential elements of the equipment.

A principal object of the present invention is to provide a device of the stated type that by reason of a novel design hereinafter described will exhibit in operation a performance in the pump priming function materially in advance of the prior commercially available devices of this character.

More specifically, an object of the invention is to provide a mechanism of the stated type that shall be capable of producing relatively high degrees of vacuum.

The invention further resides in certain novel structural details and arrangements of parts hereinafter described and illustrated in the attached drawing, in which:

Figure 1 is a view in perspective of an ejector made in accordance with my invention and constituting an element of the suction mechanism;

Fig. 2 is a longitudinal sectional view of the ejector;

Fig. 3 is a section on the line 3—3, Fig. 2.

Fig. 4 is a detached view in perspective of one of the ejector elements, and

Fig. 5 is a line drawing showing the suction mechanism as a whole.

With reference to the drawing, the ejector in a preferred embodiment comprises three principal elements consisting, respectively, of a cylindrical housing 1, a nozzle 2, and a body member 3. The housing 1 is provided at one end with a threaded port 4 for connection with the exhaust manifold or exhaust pipe of an internal combustion engine, and is provided at its opposite end with an outwardly projecting annular flange 5 having tapped holes for reception of screws 6 which secure the body member 3 to the housing. Intermediate its ends the housing has in its inner wall an annular recess 7, and a tapped port 8 formed in a boss 9 on the wall of the housing communicates with said chamber. The housing further is provided with an internal flange 11 which provides a solid abutment or seat for the nozzle 2.

The nozzle 2 is formed at its rear end, namely, that end which in assembly abuts the flange 11, with a cylindrical surface 12, and this surface, as shown in Fig. 4, neatly fits the bore of the housing 1. From this end the body of the nozzle 2 tapers inwardly to a cylindrical extension 13 of relatively small external diameter. Ribs 14 extend outwardly at the base of the extension 13, and the outer surfaces of these ribs fit neatly against the inner wall surface of the housing 1, as shown in Figs. 2 and 3. These ribs, with the surface 12, form an extended bearing for the nozzle upon the housing and maintain the nozzle definitely in a concentric position within the housing bore. The bore of the nozzle at the end adjoining the flange 11 is conical in form, as indicated at 15, and the inner end of this conical portion terminates in a cylindrical passage 16 which extends through the extension 13 of the nozzle.

The body member 3 is formed at one end to neatly fit within the bore of the housing 1, and is provided intermediate its ends with an outwardly extending flange 17 through which the bolts 6 pass. It will be noted that in assembly the flange 17 does not engage the flange 5 of the housing, so that when the bolts 6 are tightened, the inner end of the body member 3, which engages the end edges of the ribs 14, forces the nozzle 2 solidly against the abutment flange 11. The three principal elements of the nozzle are thereby held securely in their relative positions in the assembly by means solely of the bolts 6, and by removing these bolts the nozzle structure may be disassembled without disturbing the connections at the ports 4 and 8 of the housing. The body member 3 provides a rearwardly tapered passage 18 which at its inner end communicates directly with the nozzle passage 16, and as shown in Fig. 2, the passage 18 of the body member communicates at its rear or inner end with a conical terminal recess 19, which through the spaces between the ribs 14 of the nozzle 2 is in direct communication with the annular chamber 7. By reason of the neatly fitted contacting surfaces of the body member 3 and the housing 1, and the similar close fit between the nozzle 2 and the housing, the bores of the nozzle 2 and of the body member 3 are held in accurate longitudinal alignment.

The housing 1, as previously set forth, is connected through the port 4 with the exhaust manifold of the internal combustion engine 10, see Fig. 5, which engine with the ejector above described, constitutes the suction mechanism. A suitable two-way valve is positioned in the connection between the exhaust manifold of the engine and the ejector and is operable to direct the exhaust gases of the engine directly to the ejector or directly to the exhaust pipe of the engine, it being understood that the exhaust gases are passed to the ejector only during such time as it is desired to create suction at the ejector for pump priming or other suction purposes. Flow of the exhaust gases through the nozzle 2 and the body member 3 evacuates the chamber 7 and tends to draw into that chamber, through the port 8, fluid from a source with which the said port is connected. When this device is employed for priming centrifugal pumps, the port 8 is connected with the eye of the pump in well known manner.

Design of an ejector adapted to operate at the relatively low gas pressures available in the exhaust of an internal combustion engine, and to produce the required relatively high lifts, presented a problem of considerable complexity involving definite departure from the conventional design practice. It was necessary to consider not only the characteristics of the ejector per se at the available pressures, but also the effect of the presence of the ejector in the exhaust line upon the operation of the engine which constitutes the source of the operating pressure when said engine is functioning as an exhaust gas compressor. The velocity of the gases discharged through the ejector nozzle is a function of the exhaust pressure, whereas the pressure developed in the exhaust is a function of engine operation, the efficiency of which operation, when said engine is functioning as an exhaust gas compressor, being determined by the diameter and form of the nozzle passage of the nozzle. I have discovered that if the diameter of the nozzle is too great, the exhaust pressure obtainable from the engine when said engine is functioning as an exhaust gas compressor, is not sufficient to provide maximum suction at the ejector, due to the fact that the exhaust gases pass too freely through the nozzle without building up a sufficient back pressure. I have discovered, on the other hand, that if the diameter of the nozzle is too small, the exhaust pressure or exhaust back pressure will be too great between the engine and the ejector to permit the efficient operation of the engine when said engine is acting as an exhaust gas compressor, due to the fact that the excessive exhaust back pressure existing between the engine and the ejector will materially interfere with the operation of the engine, i. e., it will prevent the engine from operating smoothly and properly, and if too great will even cause the engine to stop. I have discovered that there is a direct relation between the diameter and shape of a nozzle inserted in the exhaust of an internal combustion engine and the exhaust pressure of that engine and that it is possible to design a nozzle which, within definable limits of size and shape, will be productive of the development of maximum attainable exhaust pressures by the engine when said engine is functioning as an exhaust gas compressor and, therefore, of maximum velocities of gas discharge through the nozzle. Velocity alone is not sufficient, on the other hand, to obtain high lift characteristics in the ejector, these characteristics being a function of the relation of the nozzle to the other elements of the ejector and the form and relative dimensions of those elements. I have discovered that between definable limits there is a direct relation between the forms and relative dimensions of the nozzle and of the other elements of the ejector affording maximum lift characteristics in the ejector. I have found further that all of these relations are substantially constant, and that they may, therefore, be expressed in terms of formulae permitting ready application of the principle involved to the production of ejectors for use with substantially any character of internal combustion engine and capable of affording, when used with any specific engine, performances heretofore considered unobtainable.

Referring again to the drawing, I have found that maximum velocity of nozzle discharge may be obtained by passing the exhaust gases of an internal combustion engine through a nozzle passage of the cylindrical form shown where the diameter (DN) of the passage, in inches, is approximately $\frac{1}{22}$ of the square root of the maximum brake horsepower of the said engine, and the length of the passage (LN) is approximately three times its diameter. With a nozzle passage of this character and with the ejector connected to the exhaust of an internal combustion engine when said engine is functioning as an exhaust gas compressor, the necessary exhaust pressure may be developed to establish the maximum suction at the ejector. This is accomplished by running the internal combustion engine with the throttle thereof at the "wide open" position, for it is at this position of the throttle that the engine develops its maximum brake horsepower. With a nozzle passage of a diameter in inches of approximately $\frac{1}{22}$ of the square root of the maximum brake horsepower of the internal combustion engine, maximum velocity and pressure effects will be obtained at the ejector and the said engine will operate smoothly and efficiently as an exhaust gas compressor, i. e., no excessive back pressure will be built up between the ejector and engine which would tend to affect adversely the normal operation of the engine as an exhaust gas compressor and the nozzle passage is such that the exhaust gas does not pass too readily therethrough. I have found further that exceptionally good results may be obtained by variation of these dimensions in either direction between certain limits. Thus the diameter of the nozzle passage may vary between $\frac{1}{15}$ and $\frac{1}{30}$ of the square root of the maximum brake horsepower of the engine, and the length of the nozzle may vary between $1\frac{1}{2}$ times the diameter of the nozzle passage and five times said diameter. These dimensions, therefore, may be expressed in terms of the following formulae:

$$DN=\sqrt{\frac{\text{Maximum brake H. P. of engine}}{15}} \text{ to } \sqrt{\frac{\text{Maximum brake H. P. of engine}}{30}}$$

$$LN=DN\times 1\tfrac{1}{2} \text{ to } DN\times 5$$

The limits specified in the above formulae have been found to define a critical or optimum range of dimensions, outside of which maximum suction effects are not obtainable at the ejector. If the diameter of the nozzle passage exceeds the above specified maximum, the exhaust gases pass too readily through the nozzle, whereas if the diameter of the nozzle passage is less than the above specified minimum, the back pressure is too great and affects adversely the efficient operation of the internal combustion engine. When I refer to the efficient operation of the engine, it will be understood that I refer only to the efficiency of the engine to function as an exhaust gas compressor, i. e., I am not at all concerned with the efficiency of the said engine to perform other work, such as driving a pump, propelling the vehicle, or the like, it being obvious that the ejector is connected to the engine only during such time as the said engine is functioning as a source of exhaust gas pressure for the ejector.

As previously set forth, I have found further that to utilize the velocities thus afforded to obtain a maximum lift in the ejector, the elements of the ejector structure should bear, between certain limits, a definite relation to each other. Thus the passage 18 through the body member 3 should diverge forwardly from a point of maximum restriction adjoining the nozzle 2, and this angle of divergence ($\theta$) should be approximately 2°, and may vary between 1° and 3°. The diameter of the throat of the passage 18, i. e., the diameter (DB) at the point of maximum restriction, should for best results be approximately 1.5 times the diameter (DN) of the nozzle passage, and may vary between 1.3 times that diameter and 1.7 times the diameter; and the outside diameter ($d$N) of the outer end of the nozzle 2 which lies in proximity to the throat of the passage 18 should be from $\frac{1}{32}''$ to $\frac{1}{16}''$ plus the diameter (DN) of the nozzle passage. It was found that the length (LB) of the passage 18 should for maximum results be approximately 7 times the diameter (DB) of the throat of the passage, and may vary between 4.5 times the diameter of said throat and 10 times the diameter of the throat. The end of the nozzle 2 in this assembly is preferably located at the throat of the passage 18, but may occupy a position at either axial side of this throat to a distance (A) up to .5 of the throat diameter (DB) of the passage 18. The foregoing dimensions may be expressed in terms of the following formulae:

$dN = DN + \frac{1}{32}''$ to $DN + \frac{1}{16}''$
$DB = DN \times 1.3$ to $DN \times 1.7$
$\theta = 1°$ to $3°$
$LB = DB \times 4.5$ to $DB \times 10$
$A$, the distance of the end of the nozzle 2, in either direction axially, from the throat of the passage 18, may vary within the limits of zero to $DB \times .5$.

In the above formulae the limits specified have been found to define a critical or optimum range of dimensions or angles, outside of which maximum suction effects are not obtainable at the ejector.

It will thus be seen that the most important dimension or range of dimensions relates to the diameter DN of the nozzle passage, and that once this dimension is obtained by using the known maximum brake horsepower of the engine as a basis for the calculations, the length of the nozzle passage LN, the diameter of the throat of the bore DB, etc., may be readily determined. Hence, by the invention presented herein it is a relatively simple matter to associate with any internal combustion engine of known maximum brake horsepower, the proper ejector mechanism to accomplish optimum maximum suction effects. The maximum known brake horsepower of a particular engine is generally set forth in the specifications of the engine and hence is a known quantity. Such factors as the area of the pistons in inches, the pressure in pounds weight per square inch, the length of the stroke in inches, the number of strokes per minute, the number of cylinders, etc., all contribute to the determination of the maximum brake horsepower for any given internal combustion engine, and as these factors bear a very definite relation to maximum volumetric displacement of the engine when considering said engine as an exhaust gas compressor, I have discovered that the maximum brake horsepower of an internal combustion engine may be used as a basis for calculating the dimensions of the component parts of an ejector, which ejector, when connected to the exhaust of the selected internal combustion engine and said engine operated at "wide open" throttle, will develop maximum suction effects at the ejector.

With an ejector constructed as described above, I have found it possible with the pressures available from the exhaust of an internal combustion engine, which pressures are seldom in excess of 25 pounds, to lift water vertically through heights as great as 24 feet, this lift being far in excess of the lift previously obtainable by ejector action from such exhaust pressure source. While it is known that prior to my invention attempts have been made to utilize ejectors operated from the exhaust of an internal combustion engine for the purpose of priming pumps, such attempts within my knowledge have failed in commercial application by reason of inability to produce by this means lifts of adequate height. The present invention finds an application of particular value in connection with centrifugal pumps employed in fire fighting apparatus wherein the priming operation may frequently involve lifts of water from the source to the pump of considerable heights. It is customary in modern fire fighting apparatus to provide the vehicle with an internal combustion engine which is selectively employed to propel the vehicle, or to operate the pumping equipment on the vehicle such as a centrifugal pump or the like. It is therefore a matter of great convenience to utilize the internal combustion engine mounted on the vehicle as a source of pressure fluid for operating an ejector adapted to create maximum suction effects for pump priming and/or other purposes.

I claim:

1. A suction mechanism comprising an ejector connected to the exhaust of an internal combustion engine of known maximum brake horsepower, which engine functions as a source of pressure fluid for operating the ejector, said ejector including a nozzle having a cylindrical passage through which the exhaust passes, a body member having a bore arranged in axial alignment with the nozzle passage and extending forwardly from the latter, said bore diverging towards its forward end and said nozzle being arranged with its forward end in proximity to the throat of said bore, and means providing a suction chamber outwardly of said nozzle and communicating with the rear end of said bore, said nozzle structure conforming to the terms of the following formulae:

$$DN = \frac{\sqrt{\text{Maximum brake H. P. of engine}}}{15} \text{ to } \frac{\sqrt{\text{Maximum brake H. P. of engine}}}{30}$$

$LN = 1\frac{1}{2}DN$ to $5DN$
$dN = DN + \frac{1}{32}''$ to $DN + \frac{1}{16}''$
$DB = 1.3DN$ to $1.7DN$
$\theta = 1°$ to $3°$
$A = 0$ to $.5DB$
$LB = 4.5DB$ to $10DB$ where DN is the diameter in inches of the nozzle passage, LN is the length of the nozzle passage, DB is the diameter of the throat of said bore, $\theta$ is the angle of divergence of said bore, A is the distance of the forward end of said nozzle from said throat in either direction axially of the bore, LB is the length of said bore, and $dN$ is the outside diameter of the nozzle at the forward end thereof which lies in proximity to the throat of said bore.

2. A suction mechanism comprising an ejector connected to the exhaust of an internal combustion engine of known maximum brake horsepower, which engine functions as a source of pressure fluid for operating the ejector, said ejector including a first nozzle having a passage through which the exhaust passes, a second nozzle having a bore axially aligned with and extending forwardly from the forward end of the first nozzle, and a suction chamber outwardly of said first nozzle and communicating with the rear end of said bore, said first nozzle passage being cylindrical in form and having an internal diameter in inches equal to from $\frac{1}{15}$ to $\frac{1}{30}$ of the square root of the maximum brake horsepower of the engine with which said ejector is to be connected whereby efficient operation of said engine for production of pressure fluid for suction effects may be obtained.

3. A suction mechanism as defined in claim 2, wherein the first nozzle passage has an effective length equal to from $1\frac{1}{2}$ to 5 times the internal diameter of said nozzle passage.

RICHARD B. SARGENT.